No. 706,518. Patented Aug. 12, 1902.
P. BOYD.
APPARATUS FOR WELDING AND TAPERING SOCKETS.
(Application filed Dec. 21, 1901.)
(No Model.) 2 Sheets—Sheet 1.
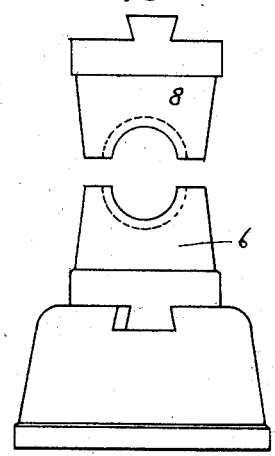
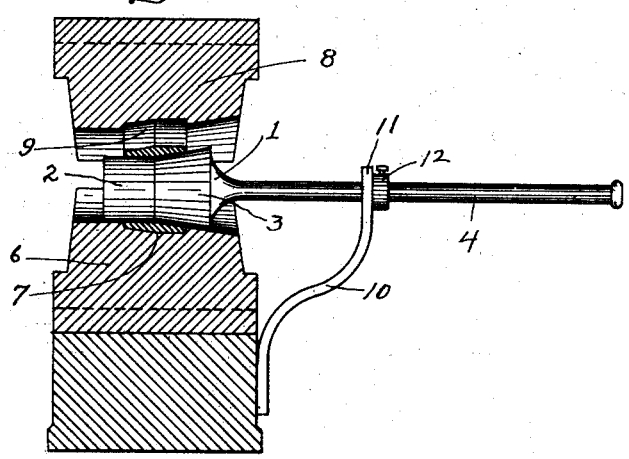
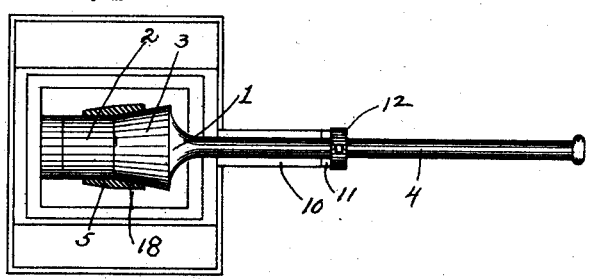
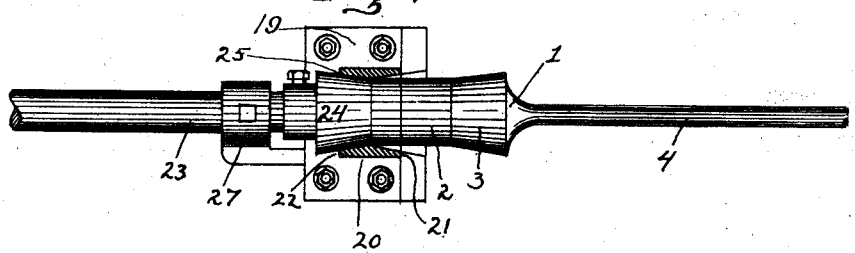
Witnesses.
Fred H. Sweet
Walter Tamariss
Inventor.
Peter Boyd
By Kay & Totten
Attorneys.

No. 706,518. Patented Aug. 12, 1902.
P. BOYD.
APPARATUS FOR WELDING AND TAPERING SOCKETS.
(Application filed Dec. 21, 1901.)
(No Model.) 2 Sheets—Sheet 2.
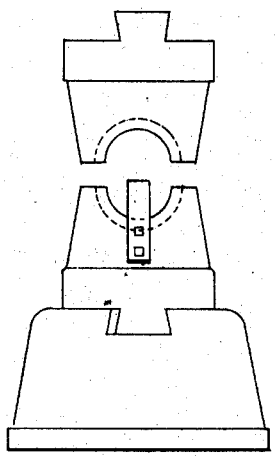
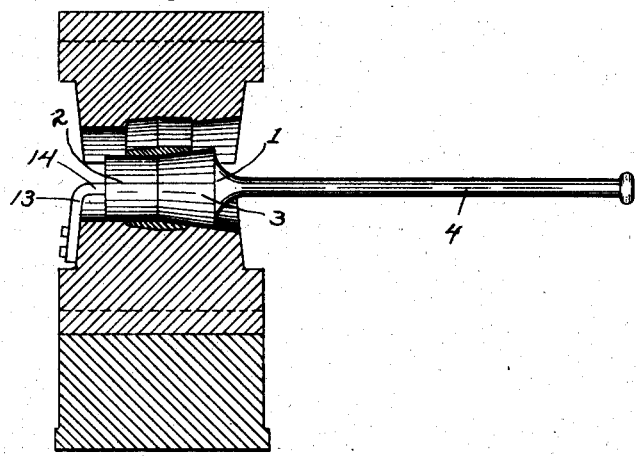
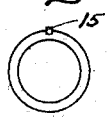
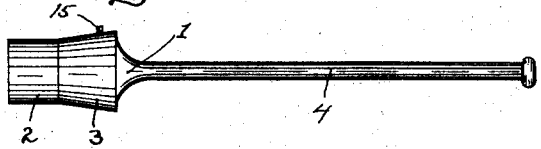
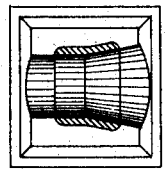
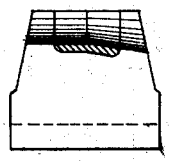
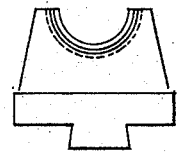
Witnesses.
Fred L. Sweet
Walter Tamarins
Inventor.
Peter Boyd
By Kay & Totten
Attorneys.

UNITED STATES PATENT OFFICE.

PETER BOYD, OF PITTSBURG, PENNSYLVANIA, ASSIGNOR TO NATIONAL TUBE COMPANY, OF PITTSBURG, PENNSYLVANIA, A CORPORATION OF NEW JERSEY.

APPARATUS FOR WELDING AND TAPERING SOCKETS.

SPECIFICATION forming part of Letters Patent No. 706,518, dated August 12, 1902.

Application filed December 21, 1901. Serial No. 86,764. (No model.)

*To all whom it may concern:*

Be it known that I, PETER BOYD, a resident of Pittsburg, in the county of Allegheny and State of Pennsylvania, have invented a new and useful Improvement in Apparatus for Welding and Tapering Sockets; and I do hereby declare the following to be a full, clear, and exact description thereof.

My invention relates to apparatus for welding, shaping, and tapering pipe couplings or sockets; and its object is to provide apparatus whereby couplings or sockets can be welded, shaped externally, and tapered internally at both ends at a single heat and with a minimum of handlings and operations.

Pipe couplings or sockets are preferably tapered at both ends, where the screw-threads are cut, so that when they are screwed onto a pipe they will form a tight joint therewith. Heretofore it has been the practice to weld and shape such couplings upon a straight mandrel, then strip the same off said mandrel, and after the coupling had cooled taper the same internally at both ends by means of a suitably-shaped reaming or tapping tool. It has also been proposed to weld and shape the couplings upon a straight mandrel, as above described, then strip the same off said mandrel, and at the same heat, by means of suitable apparatus or dies, forge or expand the ends of the couplings to produce the internal taper. In all methods of manufacture prior to my invention, however, at least three steps or operations were necessary before the coupling was ready for threading—namely, first, welding and shaping on a straight mandrel; second, stripping the welded and shaped coupling off the mandrel, and, third, either at the same heat forging or expanding the ends of the coupling to form the internal taper or after the coupling had cooled reaming out the same internally at both ends. Each additional step or operation in the manufacture of small articles of this character necessitates an additional handling thereof and adds considerably to the cost; but heretofore it has never been found practical to make such couplings with a less number of steps than those enumerated.

It is the object of my invention to provide apparatus for welding and shaping couplings or sockets and tapering the same internally at both ends, whereby the number of steps or operations and handlings are reduced and the cost correspondingly reduced.

To this end it comprises a suitable mandrel having a straight and a tapered portion, or at least a tapered portion, on which the coupling is welded, so that it will be tapered internally and preferably at one end only, together with a pusher or plunger having a tapered end adapted to push the mandrel out of the welded coupling and expand the smaller end of the coupling and taper it internally.

My invention also comprises, in combination with the mandrel and pusher, suitable welding and shaping dies and a suitable stripping-die.

It also comprises, in combination with the mandrel and the welding-dies, a suitable gage or stop for positioning the mandrel in the dies.

In the accompanying drawings, Figure 1 is a longitudinal section of one form of welding-dies and the mandrel. Fig. 2 is an end view of the dies. Fig. 3 is a plan view of the anvil-die. Fig. 4 is a plan view of the stripping-die and plunger. Figs. 5 and 6 are a longitudinal sectional and an end view, respectively, of the anvil-die and mandrel, showing a modified form of stop or gage. Figs. 7 and 8 are side and end views of the mandrel provided with a stop or gage. Figs. 9, 10, and 11 are a plan, a longitudinal sectional, and an end view, respectively, of a modified form of welding-die; and Fig. 12 is a section of the coupling formed in said die.

With all forms of my apparatus I employ a suitable mandrel 1, which is preferably provided with a straight portion 2 and a tapered portion 3, but at least with a tapered portion, and which preferably is provided with a handle 4, whereby it may be manipulated and carried. The blank having been bent into ring form and properly heated is slipped upon the mandrel to such position that it covers substantially equal parts of the straight and tapered portions 2 and 3. In this position the blank then has its ends welded together and its exterior properly shaped. Any suitable apparatus may be used for this purpose, such as an anvil and an ordinary hammer. I prefer, however, to use a suitable anvil-die, such as 6, having therein a cavity 7 of such shape as to give the proper contour to the outside of the coupling, and I preferably use, in conjunction with said anvil-die, a swaging-tool or top die 8, which is provided with a die-cavity 9 of suitable shape or contour. This top die may be actuated in any suitable way—as, for instance, by a power-cylinder. The mandrel, with the heated blank thereupon, is placed between these dies, and the top die is then raised and lowered in the usual way to weld the ends of the blank and shape the exterior of the coupling. During this operation the mandrel is preferably rotated by means of its handle 4. In order to properly position the mandrel with reference to the blank, a suitable stop or gage should be provided, and this may be of various forms. For instance, as shown in Figs. 1 and 3, the anvil-die has secured thereto the arm or bracket 10, which is provided at its upper end with the fork 11, which takes over the handle 4 and is adapted to serve as an abutment for a collar 12 on said handle. This properly positions the mandrel with reference to the die, and as the blank naturally drops into the die-cavity also positions the mandrel with reference to said blank. In Figs. 5 and 6 I have shown as a gage or stop an arm 13, suitably secured to the anvil-die and having its upper end bent inwardly, as at 14, to form a stop, against which the end of the mandrel abuts, so that the latter is properly positioned with reference to the blank. In Figs. 7 and 8 the mandrel is shown provided with a shoulder or stud 15, against which one end of the blank 5 will bear to properly position said blank on the mandrel. All of these forms of stops or gages may be made adjustable, if desired or necessary.

The cavities in the dies 6 and 8 will be made of such shape as to give the proper form to the outside of the coupling. In Figs. 1 to 3 these cavities are shown of such shape that they will form a coupling which is thicker at its middle than at its ends, while in Figs. 9, 10, and 11 they are shown of such shape that they will form a coupling having a uniform thickness from end to end, as shown in Fig. 12.

After the blank has been welded on the mandrel in the manner above described, thereby properly shaping the coupling externally and tapering one end thereof internally, as at 18, the mandrel, with the coupling thereon and still at a good forging or bending heat, is carried to the stripping devices—such, for instance, as the die 19, having therein a suitable cavity 20 for receiving the coupling and being provided at one end with the shoulder or abutment 21 and at its opposite end with the shoulder or abutment 22. The mandrel, with the coupling thereon, is laid onto this die, with its expanded or tapered end against the shoulder 21. Then a plunger 23 is brought from the opposite side against the end of the mandrel 1 and is forced forward to push said mandrel out of the coupling. This plunger is provided with a tapered head 24 of such size that it will expand the other end of the coupling and taper the same internally, as at 25. It follows that this plunger must be forced into the coupling to just the right extent and no farther, and as a consequence some means should be provided for limiting its forward movement. When the said plunger is operated by a power mechanism, such as a cam or power-cylinder, the latter can be so adjusted as to thrust the plunger forward to just the right extent and no farther. In other cases some other limiting means should be employed—such, for instance, as a collar or arm 27 on said plunger and adapted to engage with the side of the die 19 or other suitable stop. The forward movement of the plunger expands the coupling out into the die-cavity 20, so that its rear end will lie in line with the shoulder 22. When the plunger is withdrawn, this will strip the coupling off the mandrel.

I have shown the mandrel in all cases provided with a straight as well as a tapered portion; but it would be sufficient if it were tapered throughout. In that case the coupling would be tapered from end to end and the plunger-head 24 when forced into the smaller end thereof would have to expand it to a greater extent than with the shape shown in the drawings. I prefer to use a mandrel with a straight as well as a tapered portion, but wish it understood that my invention is not limited thereto.

It will be observed that by the use of the mandrel and dies described the coupling will not only be welded and shaped on the mandrel, but at the same time will be tapered internally at one end, and then by the use of the stripping devices described it will be stripped from the mandrel and expanded and tapered internally at its outer end, all this taking place at one heat and with only two operations or handlings, so that at least one step of old methods is omitted. The coupling when shaped by this apparatus is ready for the threading operation.

What I claim as my invention, and desire to secure by Letters Patent, is—

1. In apparatus for welding and tapering pipe couplings or sockets, the combination with a mandrel having a tapered portion on which the coupling is welded and tapered internally, of means for engaging the coupling and holding it stationary, and a plunger having a tapered portion and adapted to abut against the mandrel, force it out of the coupling and simultaneously expand the smaller end of the coupling and taper it internally.

2. In apparatus for welding and tapering pipe couplings or sockets, the combination with a mandrel having a straight and a tapered portion on which the coupling is welded and tapered internally at one end, of means for holding the coupling stationary, and a plunger having a tapered portion and adapted to expand the opposite end of the coupling and taper it internally.

3. In apparatus for welding and tapering pipe couplings or sockets, the combination with a mandrel having a straight and a tapered portion on which the coupling is welded and tapered internally at one end, of a stripping-die provided with a shoulder against which the enlarged end of the coupling may rest, and a plunger having a tapered portion and adapted to abut against the mandrel, force it out of the coupling and simultaneously expand the opposite end of the coupling and taper it internally.

4. In apparatus for welding and tapering pipe couplings or sockets, the combination with a mandrel having a tapered portion on which the coupling is welded and tapered internally, of a stripping-die provided with a cavity adapted to receive the coupling and having a shoulder at both ends, and a plunger having a tapered portion and adapted to abut against the mandrel, force it out of the coupling and simultaneously expand the opposite end of the coupling and taper it internally.

5. In apparatus for welding and tapering pipe couplings or sockets, the combination with a mandrel having a tapered portion on which the coupling is welded and tapered internally, of means for welding and shaping the coupling on said mandrel, means for holding the coupling stationary, and a plunger having a tapered portion and adapted to abut against the mandrel, force it out of the coupling and simultaneously expand the smaller end thereof and taper it internally.

6. In apparatus for welding and tapering pipe couplings or sockets, the combination with a mandrel having a straight and a tapered portion on which the coupling is welded and tapered internally at one end, of dies having suitably-shaped cavities for welding and shaping the coupling on said mandrel, and a plunger having a tapered portion and adapted to expand the opposite end thereof and taper it internally.

7. In apparatus for welding and tapering pipe couplings or sockets, the combination with a mandrel having a straight and a tapered portion on which the coupling is welded and simultaneously tapered internally at one end, of dies having suitably-shaped cavities for welding and shaping the coupling on said mandrel, a stripping-die provided with a shoulder against which the expanded end of the coupling may rest, and a plunger having a tapered portion and adapted to abut against the mandrel, force the latter out of the coupling, and simultaneously expand and taper internally the opposite end of the latter.

8. In apparatus for welding and tapering pipe couplings or sockets, the combination with a mandrel having a straight and a tapered portion on which the coupling is welded and simultaneously tapered internally at one end, of dies having suitably-shaped cavities for welding and shaping the coupling on said mandrel, and a stop or gage for positioning the mandrel with reference to the blank.

9. In apparatus for welding and tapering pipe couplings or sockets, the combination with a mandrel having a straight and a tapered portion on which the coupling is welded and simultaneously tapered internally at one end, of dies having suitably-shaped cavities for welding and shaping the coupling on said mandrel, and a stop on said dies and adapted to contact with the mandrel for positioning the latter with reference to the blank.

10. In apparatus for welding and tapering pipe couplings or sockets, the combination with a mandrel having a straight and a tapered portion on which the coupling is welded and simultaneously tapered internally at one end, of dies having suitably-shaped cavities for welding and shaping the coupling on said mandrel, an arm or bracket secured to the die and provided with a fork adapted to embrace the mandrel, and a collar or shoulder on the mandrel adapted to coöperate with said fork.

In testimony whereof I, the said PETER BOYD, have hereunto set my hand.

PETER BOYD.

Witnesses:
 ROBERT C. TOTTEN,
 F. W. WINTER.